J. K. PUTNAM.
RESILIENT CONNECTION.
APPLICATION FILED AUG. 22, 1910.
1,002,448.
Patented Sept. 5, 1911.
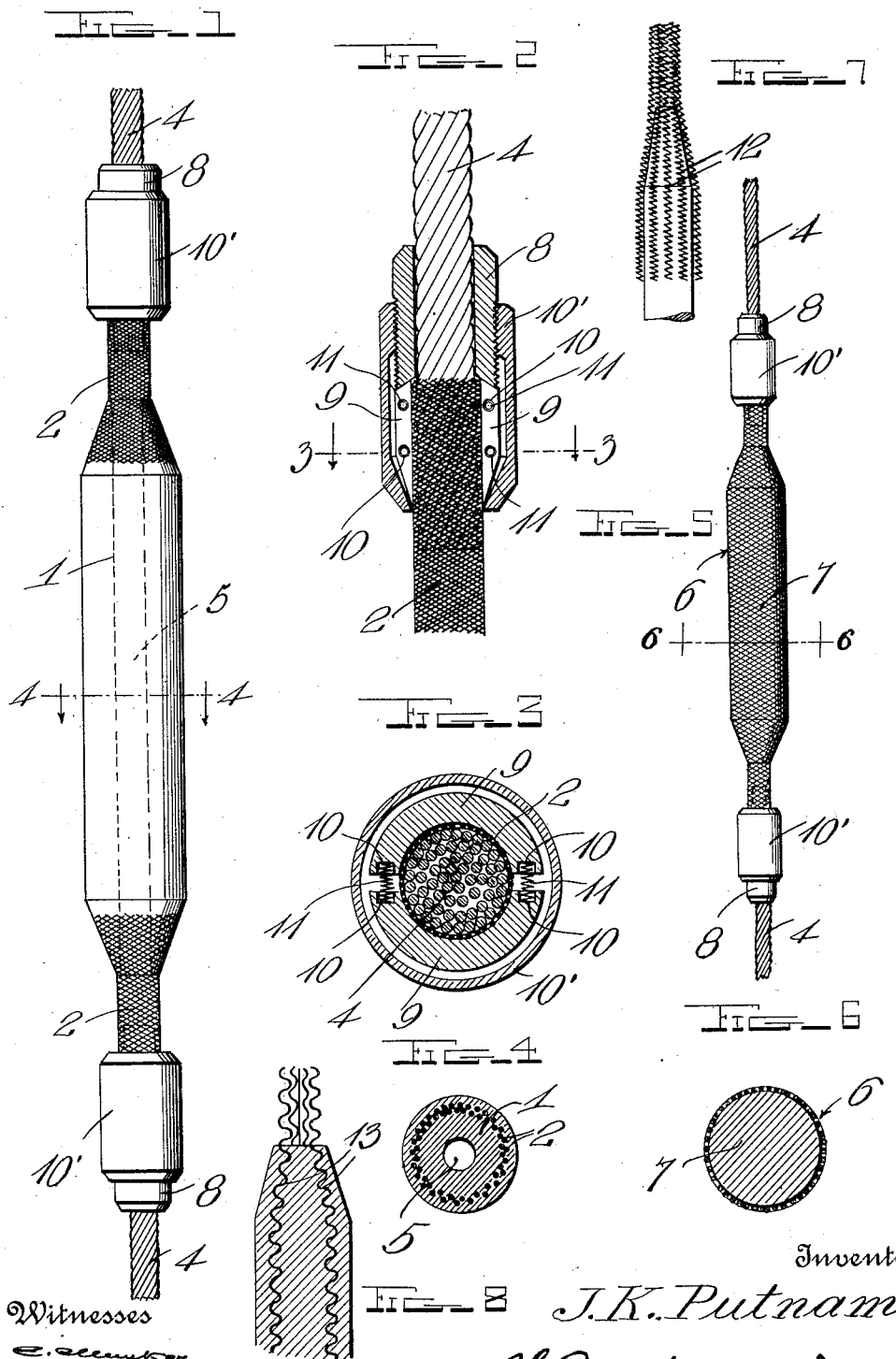

UNITED STATES PATENT OFFICE.

JAMES K. PUTNAM, OF LAWRENCEVILLE, ILLINOIS.

RESILIENT CONNECTION.

1,002,448.  Specification of Letters Patent.  Patented Sept. 5, 1911.

Application filed August 22, 1910. Serial No. 578,423.

*To all whom it may concern:*

Be it known that I, JAMES K. PUTNAM, a citizen of the United States, residing at Lawrenceville, in the county of Lawrence and State of Illinois, have invented certain new and useful Improvements in Resilient Connections; and I do declare the following to be a full, clear, and exact description of the invention, such as will enable others skilled in the art to which it appertains to make and use the same.

This invention relates to improvements in resilient connections for cables, rods and the like.

One object of the invention is to provide a resilient or elastic connection for inelastic cables and the like in which a certain amount of elasticity is required, such for instance, as drill supporting cables, tow lines and similar devices.

Another object is to provide an elastic or resilient connection of this character which will be strong and durable in construction, efficient in operation and which is provided with means for firmly securing the same to the ends of a cable or other object.

With the foregoing and other objects in view, the invention consists of certain novel features of construction, combination and arrangement of parts as will be more fully described and particularly pointed out in the appended claims.

In the accompanying drawings; Figure 1 is a side view of a portion of a cable showing the invention applied thereto; Fig. 2 is an enlarged longitudinal sectional view of the resilient connection; Fig. 3 is a transverse section on the line 3—3 of Fig. 2; Fig. 4 is a similar view on the line 4—4 of Fig. 1; Fig. 5 is a side view of a modified construction and arrangement of the connection; Fig. 6 is a transverse sectional view on the line 6—6 of Fig. 5. Fig. 7 is a detail side view of a portion of the connection showing a modified construction of the same wherein coiled wire strands are employed; Fig. 8 is a detail longitudinal sectional view of another form wherein corrugated wire strands are employed.

In the embodiment of the invention I provide a core 1, which may be of any suitable size, length and shape and which is formed of rubber or other elastic composition. In connection with the elastic core 1, I provide a sleeve or wrapping 2 of crossed wires the individual wires of which may be flat, round or formed of twisted strands.

In Figs. 1, 2 and 3 of the drawing, the wires forming the body portion of the sleeve are embedded in the elastic core 1 and lie just below the outer surface of the same. The wire sleeve 2 is extended beyond the opposite ends of the elastic core 1, said extended ends of the sleeve being reduced in diameter to correspond with the diameter of the cable 4 with which the same are engaged. The opposite ends of the elastic core 1, where the wire sleeve leaves the same, are preferably tapered or cone shaped and in the form of the invention shown in the first three figures of the drawing the core 1 is shown as being tubular or provided with a central longitudinal bore 5.

In the form of the invention shown in Figs. 5 and 6 of the drawings, the wire sleeve or covering 6 is shown as arranged on the outer side of the core 7 which is shown as being solid. In the form of the invention shown in Figs. 5 and 6 the covering 6 is formed by cross wires wound in opposite directions in the same manner as the sleeve shown in the first form of the invention.

In order to secure the ends of the wire sleeve to the ends of the cable I provide suitable clamping devices which are slipped onto the ends of the cable before said ends are engaged with the extended ends of the sleeve, which as here shown, preferably consist of exteriorly threaded tubular cable engaging members 8 which are arranged on the ends of the cable adjacent the reduced extended ends of the sleeve. With said extended ends of the sleeve into which the ends of the cable have been inserted, are engaged two segmental clamping or gripping blocks 9, the opposite ends of which are tapered or formed at a suitable angle. In the adjacent edges of the blocks 9 are formed sockets or recesses 10 in which are arranged coiled springs 11 which normally force said blocks apart or out of engagement with the reduced ends of the sleeve.

Arranged over the clamping blocks 9 are hollow clamp operating members 10', the outer ends of which have formed therein reduced threaded passages whereby said ends are adapted to be screwed onto the threaded outer surfaces of the members 8 on the ends of the cable. The inner ends of the clamp operating members 10' are reduced, said reduced ends being tapered or conical shaped and provided with a passage through which the reduced end of the wire sleeve is inserted. The tapered or conically shaped inner ends of the members 10 are adapted to engage the adjacent tapered ends of the clamping blocks 9 whereby when said members 10 are screwed outwardly on the members 8, the clamping members 9 will be drawn into engagement with the recessed inner end of the member 8 and by means of said recessed end and the conically shaped end of the member 10 will be drawn or forced together into tight gripping engagement with the reduced ends of the wire sleeves, thus binding the same into rigid engagement with the ends of the cable.

By means of an elastic or resilient connection constructed in accordance with my invention and connected with the ends of a cable or similar device in the manner described the cable will be provided with a greater or less amount of elasticity thus facilitating the use of the same for certain purposes where an entirely rigid or inelastic cable is objectionable.

In addition to the forms of the invention as hereinbefore described, I may also employ coiled and corrugated strands 12 and 13 of wire arranged on or in an elastic core as shown in Figs. 7 and 8, in the manner described, so that when the core is stretched the wire strands will straighten out thus permitting the connection to give or yield to a limited extent.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A resilient coupling for cables and the like comprising an elastic core, a plurality of wire strands extending between the ends of the core, and means for securing the ends of said strands to the members to be coupled.

2. A resilient coupling for cables and the like comprising an elastic core, an elastic sleeve carrying said core and consisting of a plurality of wire strands extending between and beyond the ends of the core, and means for securing the ends of the sleeve to the members to be coupled.

3. A resilient coupling for cables and the like comprising a rubber core, a plurality of wire strands embedded in the core and extending beyond the ends of the same, and means for clamping said strands to the members to be coupled.

4. A resilient coupling for cables and the like comprising a core, an elastic sleeve carrying said core and extending beyond the ends of the same to receive the ends of the members to be coupled, and clamping devices mounted on said members and adapted to grip the ends of the sleeve.

5. A resilient connection for cables and the like comprising a core, an elastic wire sleeve carrying the core and projecting beyond the ends of the same to encircle the members to be coupled, rings fixed on the said members, gripping blocks arranged around the ends of the elastic wire sleeves against said rings, and a clamping sleeve mounted on said rings and engaging the gripping blocks to bind them against the wire sleeve.

In testimony whereof I have hereunto set my hand in presence of two subscribing witnesses.

JAMES K. PUTNAM.

Witnesses:
  MAX WEHNERT,
  NOAH M. TOHILL.

---

Copies of this patent may be obtained for five cents each, by addressing the "Commissioner of Patents, Washington, D. C."